D. WHITEFORD.
HOT WATER HEATER.
APPLICATION FILED JUNE 28, 1912.

1,211,801.

Patented Jan. 9, 1917.

Witnesses:
Robert H. Weir
Arthur Carlson

Inventor:
David Whiteford
By Jno. G. Elliott
Atty.

UNITED STATES PATENT OFFICE.

DAVID WHITEFORD, OF CHICAGO, ILLINOIS.

HOT-WATER HEATER.

1,211,801.  Specification of Letters Patent.  Patented Jan. 9, 1917.

Application filed June 28, 1912. Serial No. 706,343.

*To all whom it may concern:*

Be it known that I, DAVID WHITEFORD, a citizen of the United States, and resident of Chicago, in the county of Cook and State of Illinois, have invented certain new and useful Improvements in Hot-Water Heaters, of which the following is a full, clear, and exact specification.

This invention relates to improvements in hot water heaters for domestic purposes in which impinging flame escaping from the bottom of a heating bowl is conducted to direct contact with the sides and top of the bowl, the bottom of the tank, and the supply pipe connection from the bottom of the tank to the bowl, and preferably from directly discharging to contact with the bottom of the bowl, and in which another pipe discharging hot water from the bowl to the upper part of the tank is entirely surrounded by supply water passing from the tank to the bowl.

The prime object of this invention is to provide in a single casting adapted by one operation to be screwed into and connect the bottom of the tank with the bowl without any change in the dimension or form of the screw threaded orifice, commonly employed for connecting pipes from furnaces and other sources of heat, which casting shall contain a supply passage connecting the bottom of the tank with the bowl, preventing supply water passing directly to contact with the bottom of the bowl, and another opening into a pipe secured to the upper end of the casting, and through which hot water is conducted from the bowl to the upper part of the tank.

Another object of my invention is a single casting for the purpose of, and connecting a heating bowl with a tank as above described, in which the passage therein conducting water from the bottom of the tank to the heating bowl is entirely surrounded by a passage through which hot water is conducted from a bowl to a tank.

With these ends in view, my invention finds embodiment in certain features of novelty in the construction, combination and arrangement of parts by which the said objects and certain other objects are hereinafter attained, all as fully described with reference to the accompanying drawing, and more particularly pointed out in the claims.

Figure 1:
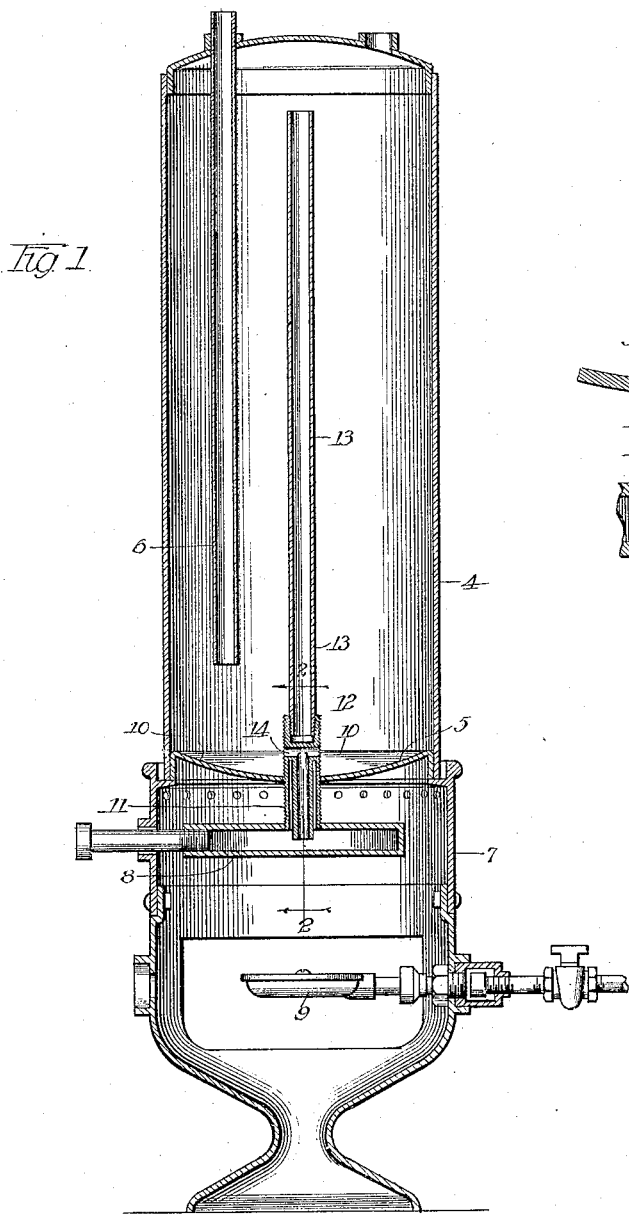
Figure 2:
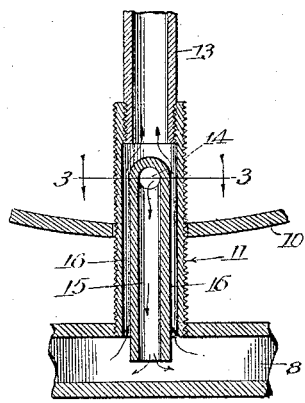
Figure 3:
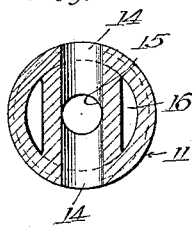

In said drawing: Figure 1 represents a longitudinal section through a hot water heater, in which my invention finds embodiment. Fig. 2 is a detail longitudinal section on the line 2—2 of Fig. 1 looking in the direction indicated by the arrows, and, Fig. 3 is an enlarged cross-section on the line 3—3 of Fig. 2.

Similar characters of reference indicate the same parts in the several figures of the drawing.

The storage tank 4, the bottom plate 5 thereof, the tank supply 6, the hollow stand 7, the thereby surrounded heating bowl 8, and the burner 9 are in construction and arrangement substantially as heretofore employed in hot water heaters for domestic purposes.

Connecting the lower portion of the tank with the heating bowl 8 is a casting 10, preferably of the form and diameter commonly employed for a pipe through which hot water from a furnace or other heating source is conducted through the bottom of the tank to the upper part thereof, which casting is preferably provided with right and left hand screw-threads 11, by means of which it may be simultaneously screwed into the tank and the heating bowl 8 suspended therefrom, and also preferably with internal screw-threads 12 at its upper end for securing the lower end of a discharge pipe 13 terminating at a point shortly below the top of the tank.

In the casting 10 is a T-shaped passage for a supply of water, both ends of the T-bar 14 of which are open and discharge supply water from the tank through its passage 15 into the bowl at a point between the surfaces of the top and bottom wall of the bowl, whence hot water ascending therefrom discharges through an inverted U-shaped passage 16, through the pipe 13 to the upper part of the tank.

The U-shaped hot water discharge passage 16 not only surrounds the stem passage for supply water, but also the sides of so much of the inlet passage thereto as crosses the path of the hot water discharge passage 16, thereby providing a means by which substantially the heat conducting walls of the entire supply passage are exposed to the heat of conduction therethrough from the ascending hot water, thereafter discharged into the upper part of the tank. Owing to the form and arrangement of these supply and water discharge passages, there is no difficulty in providing a single casting containing both, in a single casting containing a minimum amount of metal, requiring no finishing further than cutting thereon the internal screw-threads 12 for the pipe 13 and external screw threads 11, as a means for simultaneously connecting the heating bowl with the bottom wall of a tank and with an opening therein, of the form and diameter of tanks commonly and largely used.

Bearing in mind that one of the objects of this invention is to utilize the heat of the ascending hot water to raise the temperature of the supply water in its passage from the tank to the heating bowl, it will now be observed that for that purpose and as shown in the drawing, the casting is so formed as to terminate the discharge passage at the top of the bowl and project the supply passage centrally of, and so far toward the bottom of the bowl, that the supply water contacting with the bottom of the bowl will be confined to a very small area thereof, as compared with its entire area, and at a point where the heat imparted by the impinging flame to the bottom is the greatest, with the result that the hot water surrounding the supply water in its passage from the tank to the bowl is little reduced in temperature, that it discharges into the upper part of the tank at substantially the highest temperature it had on leaving the bowl. My invention, therefore, makes it practical and possible for supply water to directly contact with the bottom of a heating bowl without materially reducing the temperature of the hottest water therein, and concurrently therewith maintaining the discharge of hot water from the bowl so hot that it will substantially raise the temperature of the supply water during its descent from the tank to the bowl without materially reducing the temperature of the hot water otherwise discharged into the top of the tank. In this connection it should also be understood that in the structure shown, the current of the supply water in the heating bowl is from its center toward its outer side, and that of the rising hot water from the outside toward the center, and at the same time in an upward direction toward the discharge passage 16, and from this point upwardly into the discharge pipe 13, and that, therefore, the volume of supply water admitted to the bowl is regulated and determined by the greatness or smallness, as it may be, of the volume of hot water displaced in the bowl by the discharge into the upper part of the tank.

In practice, when with a given applied flame heat it is desirable to furnish the upper part of the tank with a small volume of water at a very high degree of heat, the discharge passage in the casting and in the pipe are made accordingly smaller than that of the supply passage, and, from this it will be seen, that when the discharge passage in the casting and pipe are the same, the supply water from the bowl will be equal, and that with the discharge passages greater than the supply, a larger volume of water in a given time will be furnished the upper part of the tank. My invention is, therefore, not limited to the details of construction herein described, but includes any casting in which the walls of supply and discharge passages therein are integrally formed and connected when so arranged with reference to each other, a tank, and a heating bowl, that supply water passing from the bottom of a tank into a heating bowl is surrounded, and its temperature raised by hot water discharging from the bowl into the tank, without substantially reducing the temperature of the hot water in, or passing from the bowl.

The application of my invention to structures wherein the impinging flame of a burner escaping from the bottom of a heating bowl is directed to contact with the side and top of the bowl, the bottom of the tank, and the pipe connecting the tank with the bowl, preferred for the reason that the temperature of the supply water is thereby raised to a degree so high that so much of it as may directly contact with the bottom of the bowl will not materially reduce the temperature of that bottom.

Having described my invention, what I claim and desire to secure by Letters Patent is:

1. A hot water heater comprising in combination a water tank, supply pipes for discharging cold and hot water therein respectively near the bottom and top thereof, an undivided water heating bowl, a coupling for connecting said bowl and tank provided with a cold water passage projecting into the heating bowl, a hot water passage external of said cold water passage connected to the discharge pipe, and with a transverse passage therethrough connecting with the cold water passage in a plane above the bottom of the tank.

2. A hot water heater comprising in combination a water tank, supply pipes for discharging cold and hot water therein, respectively near the bottom and top thereof, an undivided water heating bowl, a coupling, adapted to suspend the heater from the tank, provided with a cold water passage closed across its upper end, and projecting into the body of the water in the heating bowl, a hot water passage externally of said cold water passage and connected to the hot water discharge pipe, and with a transverse passage therethrough connecting with the cold water passage below the top end thereof, and in a plane above the bottom of the tank.

3. The combination with a water containing tank provided with cold and hot water supply pipes discharging respectively toward the bottom and top thereof, a heater for the contents of said tank, a coupling adapted to suspend the heating bowl from the tank provided with a hot water passage connected to the hot water supply pipe and a cold water passage projecting through the hot water passage and having an axis in common with the hot water passage and the axis of the hot water supply pipe, whereby the descending cold water is conductively exposed to the heat of the hot water passing therethrough.

In witness whereof I have hereunto set my hand and affixed my seal, this 22nd day of June A. D. 1912.

DAVID WHITEFORD. [L. S.]

Witnesses:
MILDRED ELSNER,
JNO. G. ELLIOTT.

Copies of this patent may be obtained for five cents each, by addressing the "Commissioner of Patents, Washington, D. C."